(12) United States Patent
Yamamoto et al.

(10) Patent No.: US 6,564,662 B2
(45) Date of Patent: May 20, 2003

(54) SHIFT-ASSISTING DEVICE FOR A TRANSMISSION

(75) Inventors: Yasushi Yamamoto, Kanagawa (JP); Nobuyuki Iwao, Kanagawa (JP)

(73) Assignee: Isuzu Motors Limited, Tokyo (JP)

( * ) Notice: Subject to any disclaimer, the term of this patent is extended or adjusted under 35 U.S.C. 154(b) by 0 days.

(21) Appl. No.: 09/891,170

(22) Filed: Jun. 26, 2001

(65) Prior Publication Data

US 2002/0000134 A1 Jan. 3, 2002

(30) Foreign Application Priority Data

Jun. 29, 2000 (JP) ........................................ 2000-196956

(51) Int. Cl.⁷ .............................................. F16H 63/00
(52) U.S. Cl. ...................................... 74/335; 74/473.12
(58) Field of Search .............................. 74/335, 473.12, 74/473.3, 388 R

(56) References Cited

U.S. PATENT DOCUMENTS

| | | | | |
|---|---|---|---|---|
| 4,485,726 A | * | 12/1984 | Inoue | 91/375 R |
| 4,570,502 A | * | 2/1986 | Klatt | 74/335 |
| 4,631,679 A | * | 12/1986 | Klatt | 701/52 |
| 4,742,724 A | * | 5/1988 | Jimbo et al. | 74/388 R |
| 4,911,031 A | * | 3/1990 | Yoshimura et al. | 477/123 |
| 5,459,658 A | * | 10/1995 | Morey et al. | 477/102 |
| 5,894,758 A | * | 4/1999 | Walker | 477/109 |
| 5,974,906 A | * | 11/1999 | Stine et al. | 477/124 |
| 6,062,097 A | * | 5/2000 | Imao et al. | 74/335 |
| 6,073,507 A | * | 6/2000 | Ota et al. | 477/906 |
| 6,105,449 A | * | 8/2000 | Genise et al. | 477/124 |
| 6,145,398 A | * | 11/2000 | Bansbach et al. | 477/76 |
| 6,224,511 B1 | * | 5/2001 | Steeby | 477/111 |

* cited by examiner

*Primary Examiner*—Sherry Estremsky
*Assistant Examiner*—David D. Le
(74) *Attorney, Agent, or Firm*—Antonelli, Terry, Stout & Kraus, LLP

(57) ABSTRACT

A shift-assisting device for a transmission that is equipped with an electric motor for operating a shifting mechanism in the same direction as the direction in which a speed-change lever is shifted, the shifting mechanism being coupled to the speed-change lever and actuating the synchronizing mechanism of the transmission. The shift-assisting device includes a controller for controlling the electric motor. The controller judges whether the gear is to be disengaged or engaged based on the shifting direction of the speed-change lever and on the shift stroke position of the shifting mechanism, detects the shifting operation speed, obtains an average shifting operation speed in the gear-disengaging operation or the gear-engaging operation, and determines the electric power for driving the electric motor based on the average shifting operation speed.

4 Claims, 6 Drawing Sheets

SHIFT-ASSISTING DEVICE FOR A TRANSMISSION

FIELD OF THE INVENTION

The present invention relates to a shift-assisting device for reducing the shifting operation force in changing the speed of a transmission mounted on a vehicle.

DESCRIPTION OF THE PRIOR ART

Large trucks and buses that require a large shifting force for changing the speed have been equipped with a shift-assisting device for executing the shifting operation with a decreased force. The shift-assisting device with which large vehicles are furnished generally uses compressed air as a source of operation. The shift-assisting device that uses compressed air as the source of operation is equipped with a shift actuator comprising a pneumatic pressure cylinder that operates the speed-change operation mechanism coupled to a speed-change lever in the same direction as the direction in which the speed-change lever is shifted. Large vehicles generally use compressed air as a source for operating the brake and are, hence, able to use the compressed air for the shift-assisting device. However, small- and medium-sized vehicles that are not equipped with a compressor as a source of compressed air, cannot be provided with a shift-assisting device that uses a shift actuator which comprises a pneumatic pressure cylinder. In recent years, however, it has been desired to provide even small- and medium-sized vehicles with the shift-assisting device, and there have been proposed shift-assisting devices using an electric motor, as taught in, for example, Japanese Laid-open Patent Publication (Kokai) No. 87237/1993 (JP-A 5-87237) and Japanese Patent No. 2987121. In a shift-assisting device using an electric motor, it is desired that the driving force of the electric motor be controlled depending upon the manner of operating the speed-change lever by the driver so that a smooth shifting operation can be conducted. According to the shift-assisting devices disclosed in the above Japanese Laid-open Patent Publication (Kokai) No. 87237/1993 and Japanese Patent No. 2987121, the force for operation of the speed-change lever toward the direction of shift is detected, and the driving force of the electric motor is controlled according to this force of operation. Further, Japanese Patent No. 2987121 discloses a technology in which the speed of the shifting operation is detected and the rate of the driving force of the electric motor is increased with an increase in the speed of the shifting operation.

In shifting a transmission equipped with a synchronizing mechanism, the largest operation force is required for bringing the gears into engagement in a synchronizing operation in the gear-engaging operation, and then, a second largest force is required for engaging the chamfer of dog teeth with the chamfer of the spline of the clutch sleeve. And, in an gear-disengaging operation, an operation force is required during from the start of the gear-disengaging operation until the dog teeth are disengaged from the spline of the clutch sleeve. In a shift-assisting device for controlling the driving force of an electric motor according to the operation force, however, the electric motor is driven after the operation force has reached a predetermined value, and, hence, there exists a time lag until the assisting force is produced after the operation force has increased. In shifting the transmission, therefore, the driver feels a large force just before the assisting force is produced by the electric motor. In order to solve this problem, the present applicant has proposed in Japanese Patent Application No. 46173/2000 a shift-assisting device for a transmission, equipped with a shift stroke sensor that detects the shift stroke position of the shifting mechanism and controls an electric motor for assisting the shifting operation correspondingly to the shift stroke position based on a detection signal from the shift stroke sensor.

Drivers have their peculiar habits of conducting the speed-change operation and, hence, it is also desired to control the shift-assisting force by taking into consideration the habits of the drivers. As for habits of the drivers for conducting the speed-change operation, the shifting operation speed may appear as the greatest element in determining the shift-assisting force. Namely, it is desired to increase the shift-assisting force with an increase in the shifting operation speed. However, the shifting operation speed greatly varies depending upon the shift stroke position of the shifting mechanism. That is, the shifting operation speed varies depending upon the gear-disengaging operation and the gear-engaging operation. Further, even in the gear-engaging operation, the operation speed in the synchronizing operation greatly differs from that in other shift stroke regions. It is therefore desired to detect the operation speed in a shift stroke region reflecting the peculiar habit of the driver and to determine the shift-assisting force based on t his operation speed.

SUMMARY OF THE INVENTION

It is an object of the present invention to provide a shift-assisting device for a transmission, which determine s the shift-assisting force based on an average value of the speeds of operation in a predetermined shift strok e section where the habit of a driver is greatly reflected.

In order to accomplish the above-mentioned object, the present invention provides a shift-assisting device for a transmission, equipped with an electric motor for operating a shifting mechanism in the same direction as the direction in which a speed-change lever is shifted, the shifting mechanism being coupled to the speed-change lever and actuating a synchronizing mechanism of the transmission, the shift-assisting device for a transmission comprising:

a shift stroke sensor for detecting a shift stroke position of the shifting mechanism;

a shifting direction detection means that produces signals corresponding to the operation of the speed-change lever in a first shifting direction and in a second shifting direction; and a controller for producing a drive signal to the electric motor based on signals detected by the shift stroke sensor and by the shifting direction detection means;

wherein the controller judges whether the gear is to be disengaged or engaged based on the shifting direction of the speed-change lever and on the shift stroke position of the shifting mechanism, detects the shifting operation speed and obtains an average shifting operation speed in the gear-disengaging operation or in the gear-engaging operation, determines the electric power for driving the electric motor based on the average shifting operation speed, and drives the electric motor with a drive electric power that has been determined.

It is desired that the shifting operation speed in the gear-disengaging operation be an operation speed in a predetermined section from a shift stroke position where the clutch sleeve of the synchronizing mechanism is disengaged from the dog teeth to a neutral position. It is further desired that the shifting operation speed in the gear-engaging operation be an operation speed in a predetermined section from a position where the synchronization of the synchronizing mechanism ends to a final shift stroke position.

The electric power for driving the electric motor is obtained by adding up an initial set-point electric power that is set correspondingly to the shift stroke position and a corrected electric power calculated based on the average shifting operation speed in the gear-disengaging operation.

DETAILED DESCRIPTION OF THE PREFERRED EMBODIMENTS

A preferred embodiment of the shift-assisting device for a transmission, constituted according to the present invention will be described in further detail with reference to the accompanying drawings.

Figure 1:
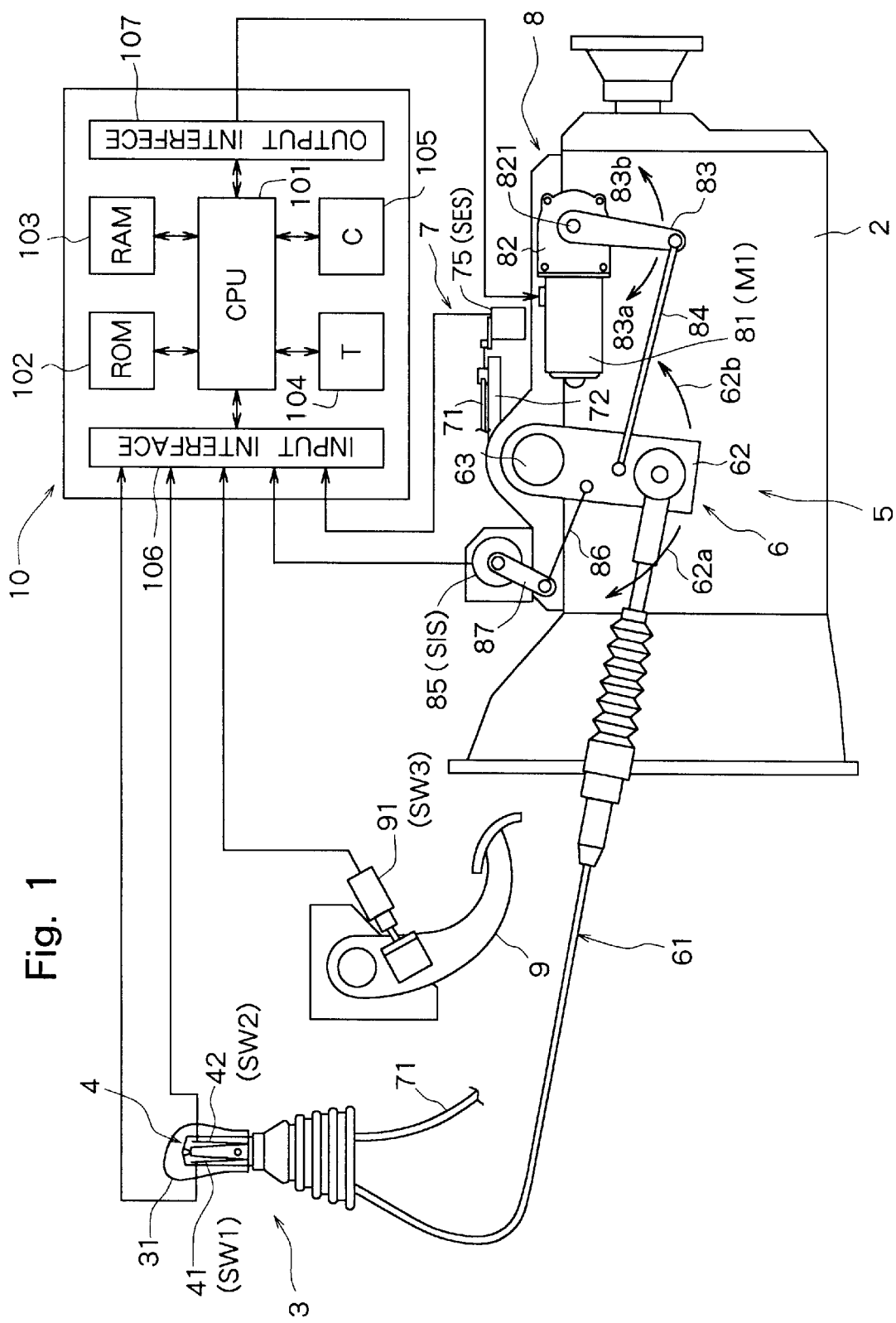
FIG. 1 is a diagram schematically illustrating tnstitution of a speed-changing mechanism equipped with a shift-assisting device in a transmission, constituted according to the present invention.

FIG. 1 is a diagram schematically illustrating the constitution of a speed-changing mechanism equipped with a shift-assisting device for a transmission, constituted according to the present invention.

The speed-changing mechanism shown in FIG. 1 comprises a speed-change lever 3 for changing the speed of a transmission 2 equipped with a synchronizing mechanism, a speed-change operation mechanism 5 coupled to the speed-change lever 3, and a shift-assisting device 8 for operating the speed-change operation mechanism 5 in the same direction as the direction in which the speed-change lever 3 is shifted.

Figure 2:
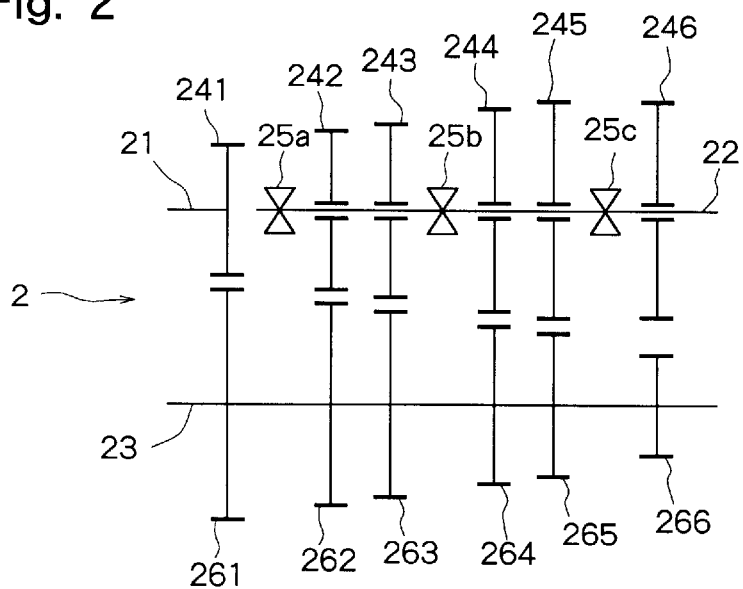
FIG. 2 is a diagram schematically illustrating the constitution of a gear mechanism in the transmission of FIG. 1.

Referring to FIG. 2, the transmission 2 comprises a gear mechanism of five forward speeds and one reverse speed. The transmission 2 has an input shaft 21, an output shaft 22 disposed on the same axis as that of the input shaft 21, and a counter shaft 23 arranged in parallel with the output shaft 22. On the input shaft 21 is mounted a drive gear 241 (a fifth speed gear in the illustrated embodiment), and on the output shaft 22 are rotatably mounted a fourth speed gear 242, a third speed gear 243, a second speed gear 244, a first speed gear 245 and a reverse gear 246. On the output shaft 22 are further disposed synchronizing mechanisms 25a, 25b and 25c between the fifth speed gear 241 and the fourth speed gear 242, between the third speed gear 243 and the second speed gear 244, and between the first speed gear 245 and the reverse gear 246, respectively. On the counter shaft 23, there are arranged counter gears 261, 262, 263, 264 and 265 that are in mesh with the fifth speed gear 241, fourth speed gear 242, third speed gear 243, second speed gear 244 and first speed gear 245 at all times, as well as a counter gear 266 that is in mesh with the reverse gear 246 via an idling gear that is not shown.

Figure 3:
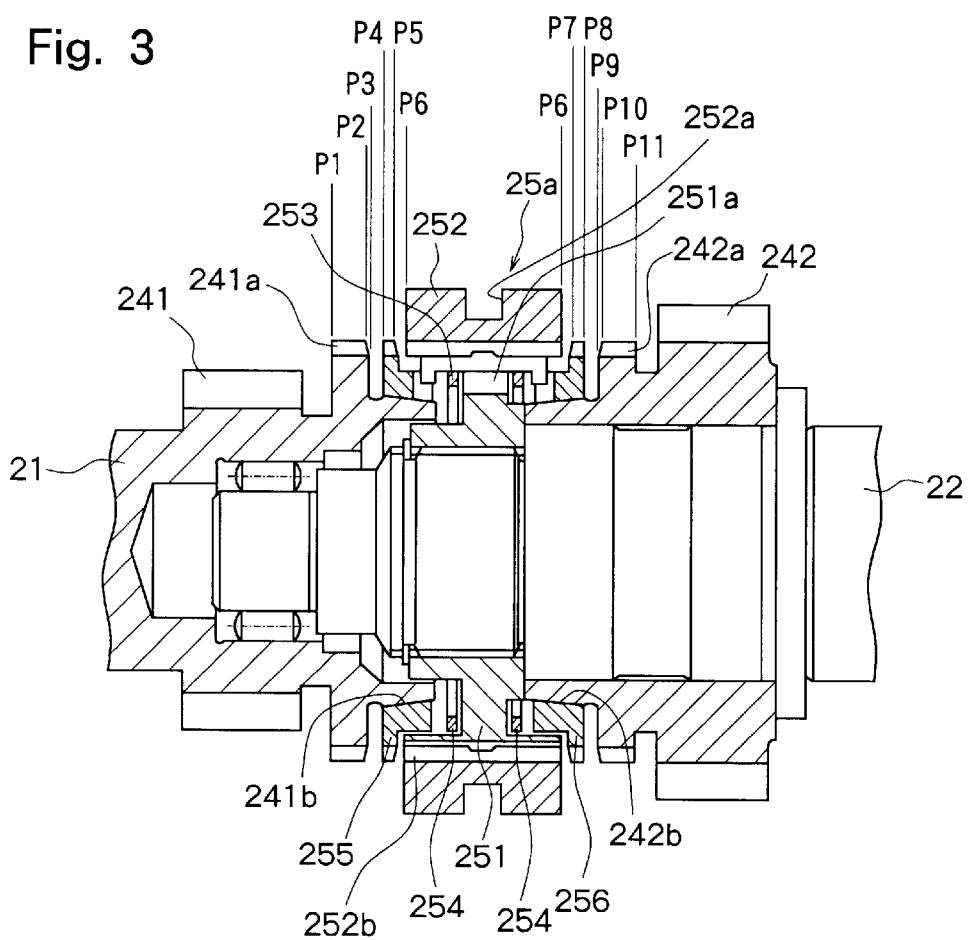
FIG. 3 is a sectional view of a synchronizing mechanism with which the transmission of FIG. 1 is provided.

Next, the synchronizing mechanisms 25a, 25b and 25c will be described with reference to FIG. 3. The illustrated synchronizing mechanisms 25a, 25b and 25c are all constituted substantially in the same manner. Therefore, described below is the synchronizing mechanism 25a only that is disposed between the fifth speed gear 241 and the fourth speed gear 242.

The illustrated synchronizing mechanism 25a is a known key-type synchronizing mechanism which comprises a clutch hub 251 mounted on the output shaft 22, a clutch sleeve 252 slidably fitted to an external gear spline formed on the outer circumference of the clutch hub 251, keys 253 arranged in plural (e.g., three) key grooves 251a formed in the clutch hub 251 in the radial direction thereof, key springs 254, 254 arranged on the inner sides at both ends of the keys 253 to push the keys 253 toward the clutch sleeve 252, dog teeth 241a and 242a formed on the fifth speed gear 241 and on the fourth speed gear 242, and synchronizer rings 255 and 256 disposed on the conical surfaces 241b and 242b formed on the fifth speed gear 241 and on the fourth speed gear 242. The thus constituted synchronizing mechanism 25a has a shift fork fitted into an annular groove 252a formed in the outer circumference of the clutch sleeve 252, the shift fork being mounted on a shift rod of a shifting mechanism that constitutes the speed-change operation mechanism 5 as will be described later. The clutch sleeve 252 is slid by the shift fork toward either the right or the left in the drawing, whereby the spline 252b of the clutch sleeve 252 is brought into mesh with the teeth of the synchronizer ring 255 and dog teeth 241a or with the synchronizer ring 256 and dog teeth 242a. The illustrated synchronizing mechanism has been constituted in a known manner and hence, is not described here in further detail.

Figure 4:
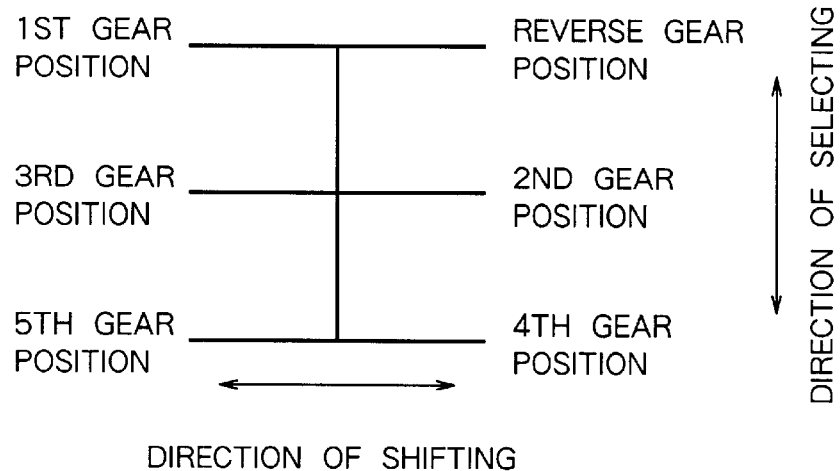
FIG. 4 is a diagram illustrating the shifting pattern of the speed-change lever in the speed-changing mechanism shown in FIG. 1.

The above-mentioned synchronizing mechanisms 25a, 25b and 25c are operated by the speed-change lever 3 and by the speed-change operation mechanism 5 connected to the speed-change lever 3. The speed-change lever 3 is so constituted as can be tilted in a direction (direction of selection) perpendicular to the surface of the paper in FIG. 1 and in the right-and-left direction (direction of shift) with a shaft as a center, that is not shown, In order to operate the synchronizing mechanisms 25a, 25b and 25c, the speed-change lever 3 is operated along a speed-change pattern shown in FIG. 4. A shift knob switch 4 is disposed in a knob 31 of the speed-change lever 3. The shift knob switch 4 comprises a first switch 41 (SW1) and a second switch 42 (SW2) for detecting the direction of operation when the knob 31 of the speed-change lever 3 is tilted in the direction of shift. The shift knob switch 4 is, for example, so constituted that the first switch 41 (SW1) is turned on when the knob 31 of the speed-change lever 3 is tilted toward the left (the first shifting direction) in FIG. 1 and that the second switch 42 (SW2) is turned on when the speed-change lever 3 is tilted toward the right (the second shifting direction) in FIG. 1. The shift knob switch 4 is further so constituted that both the first switch 41 (SW1) and the second switch 42 (SW2) are turned off when the driver separates his hand away from the knob 31 of the speed-change lever 3, and the on and off signals are sent to a controller that will be described later. The shift knob switch 4 works as a shifting direction detection means that produces signals corresponding to the operation of the speed-change lever 3 in the first shifting direction and in the second shifting direction. The above shift knob switch pertains to a known technology as disclosed in, for example, Japanese Laid-open Utility Model Publication (Kokai) No. 97133/1981 and hence, is not described here in further detail.

Figure 5:
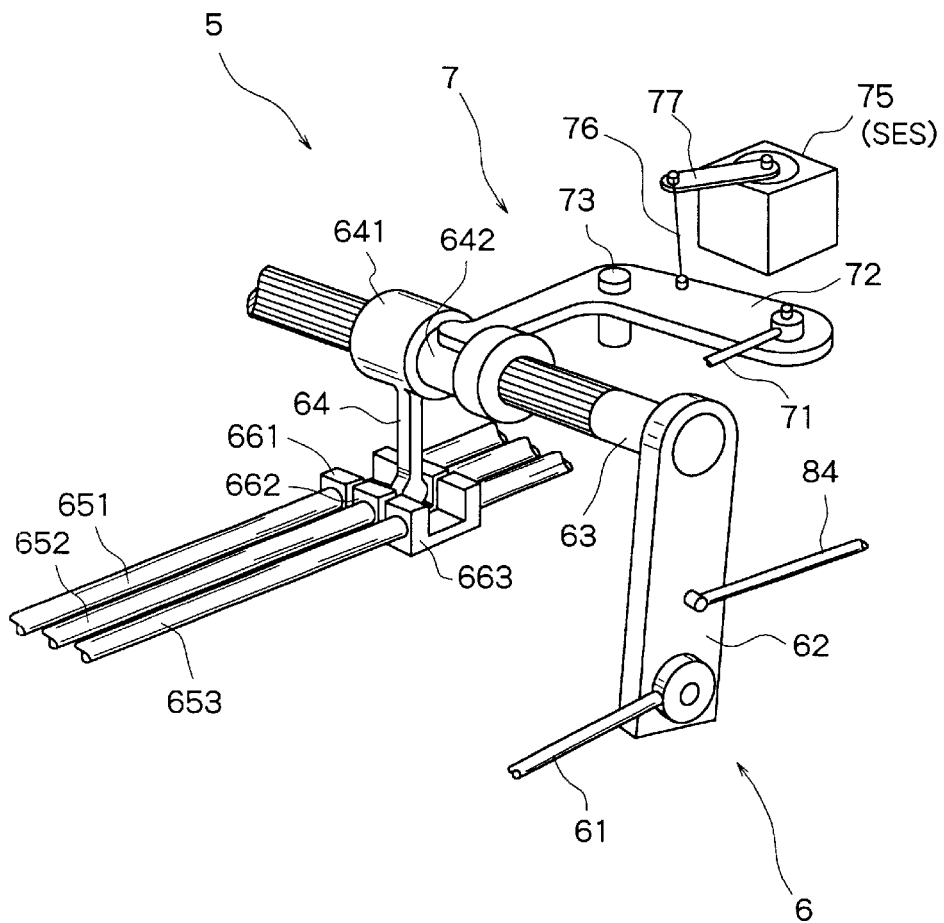
FIG. 5 is a perspective view illustrating major portions of the shifting mechanism in the speed-changing mechanism shown in FIG. 1.

Next, described below with reference to FIGS. 1 and 5 is the speed-change operation mechanism 5 that is coupled to the speed-change lever 3 for operating the above-mentioned synchronizing mechanisms 25a, 25b and 25c.

The speed-change operation mechanism 5 is constituted by a shifting mechanism 6 and a selector mechanism 7. The shifting mechanism 6 includes a push-pull cable 61 which is connected at its one end to the speed-change lever 3, a control lever 62 which is connected at its one end to the other end of the push-pull cable 61, a control rod 63 which is connected to the other end of the control lever 62 and is pivotably supported by a case cover (not shown) of the transmission 2, and a shift lever 64 fitted by spline to the control rod 63 so as to slide in the axial direction. The shift lever 64 selectively engages at its end with a shift block 661, 662 or 663 mounted on the shift rods 651, 652 and 653. Shift forks (not shown) are mounted on the shift rods 651, 652 and 653, and engage with the annular grooves formed in the outer circumferences of the clutch sleeves of the synchronizing mechanisms 25a, 25b and 25c. Known interlocking mechanisms are arranged among the shift rods 651, 652 and 653, so that two shift rods will not operate simultaneously. The shifting mechanism 6 is constituted in a known manner and hence, is not described here in further detail.

The shift lever 64 is slid in the axial direction by the selector mechanism 7 and is brought to a predetermined selected position. The selector mechanism 7 includes a push-pull cable 71 coupled, at its one end, to the speed-change lever 3, and a selecting lever 72 coupled, at its one end, to the other end of the push-pull cable 71. Selecting lever 72 is supported at its intermediate portion so as to rotate on a support shaft 73 as a center. The other end of the selecting lever 72 is brought into engagement with a fitting groove 642 formed in the outer peripheral surface of a mounting boss portion 641 of the shift lever 64. By moving the speed-change lever 3 in the direction of selection, therefore, the shift lever 64 is slid on the control rod 63 in the axial direction via the push-pull cable 71 and the selecting lever 72. The other end of the shift lever 64 is brought into selective engagement with a selected one of the shift blocks 661, 662 or 663. The selecting mechanism 7 has a known constitution and hence, is not described here in further detail.

The selecting mechanism 7 in the illustrated embodiment is equipped with a selected position sensor 75 (SES) for detecting the position of the shift lever 64 in the direction of selection. The selected position sensor 75 (SES) is coupled to the selecting lever 72 via a rod 76 and a lever 77 and is constituted by a potentiometer that detects the position of the shift lever 64 in the direction of selection according to the angle of operation of the selecting lever 72. A detection signal thereof is sent to the controller 10.

In the illustrated embodiment, the shift-assisting device 8 is provided for operating the above-mentioned shifting mechanism 6 in the same direction as the direction in which the speed-change lever 3 is shifted. The shift-assisting device 8 is equipped with an electric motor 81 (M1) that can be rotatively driven forward and reverse as a source of driving force. A reduction gear 82 is coupled to the electric motor 81 (M1), and an end of an operation lever 83 is mounted on an output shaft 821 of the reduction gear 82. The other end of the operation lever 83 is coupled to the control lever 62 via a coupling rod 84. When the electric motor 81 (M1) is driven forward, the thus constituted shift-assisting device 8 actuates the operation lever 83 in the direction indicated by an arrow 83a and moves the control lever 62 via the coupling rod 84 in the direction indicated by an arrow 62a to assist the shifting operation. When the electric motor 81 (M1) is driven reverse, on the other hand, the shift-assisting device 8 actuates the operation lever 83 in the direction indicated by an arrow 83b, and moves the control lever 62 via the coupling rod 84 in the direction indicated by an arrow 62b to assist the shifting operation.

The shift-assisting device 8 in the illustrated embodiment is provided with a shift stroke sensor 85 (SIS) for detecting the shift stroke position of the shift mechanism. The shift stroke sensor 85 (SIS) is connected to the control lever 62 via a rod 86 and a lever 87, is constituted by a potentiometer that detects the shift stroke position according to the angle of operation of the control lever 62, and sends a detection signal to the controller 10.

The controller 10 is constituted by a microcomputer which comprises a central processing unit (CPU) 101 for executing the operation according to a control program, a read-only memory (ROM) 102 for storing the control program and a map for controlling the speed of connecting the clutch, a read/write random access memory (RAM) 103 for storing the results of operation, a timer (T) 104, a counter (C) 105, an input interface 106 and an output interface 107. The input interface 106 of the thus constituted controller 10 receives signals detected by the first switch 41 (SW1) and the second switch 42 (SW2) constituting the shift knob switch 4, and signals detected by the selected position sensor 75 (SES) and by the shift stroke sensor 85 (SIS). The input interface 106 further receives a signal detected by a clutch pedal switch 91 (SW3) which detects the state of operation of a clutch pedal 9 for operating the clutch disposed between the engine that is not shown and the transmission 2. The clutch pedal switch 91 (SW3) is turned off in a state where the clutch pedal 9 is released, i.e., where the clutch pedal 9 is not depressed (clutch is connected), and produces a signal ON when the clutch pedal 9 is depressed to disconnect the clutch. When an automatic clutch is mounted to automatically disconnect or connect the clutch based on the signals from the shift knob switch 4 and from the shift stroke sensor 85 (SIS), the input interface 106 receives a signal detected by a clutch stroke sensor that detects the amount of engagement of the clutch instead of the clutch pedal 9. On the other hand, the output interface 107 sends control signals to the electric motor 81 (M1) and the like.

Figure 6:
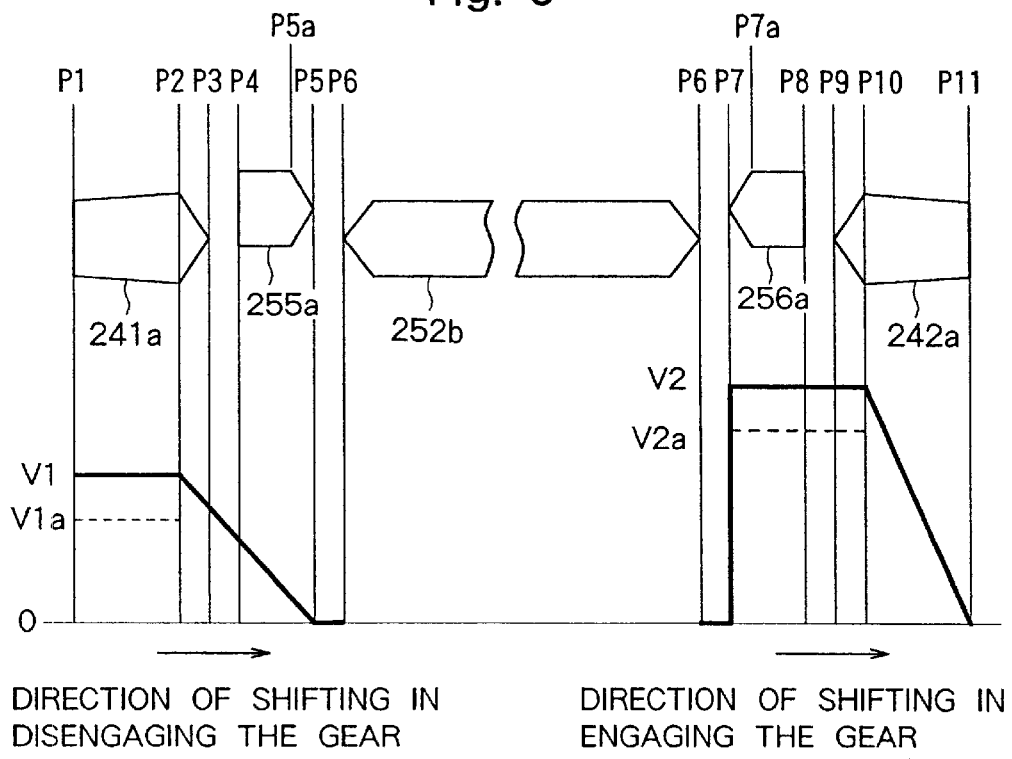
FIG. 6 is a diagram illustrating the relationship between the shift stroke positions of the clutch sleeve in the synchronizing mechanism shown in FIG. 3 and the voltage applied to an electric motor in the shift-assisting device.

Next, the assisting force corresponding to the shift stroke position will be described with reference to FIG. 6. FIG. 6 illustrates a positional relationship among the spline 252b of the clutch sleeve 252, the teeth 255a of the synchronizer ring 255 for the fifth speed gear 241 and dog teeth 241a, the teeth 256a of the synchronizer ring 256 for the fourth speed gear 242 and dog teeth 242a in their neutral state. In the embodiment shown in FIG. 6, the shift stroke position of the clutch sleeve 252 in its neutral state is designated at P6. P5 denotes the shift stroke position (position where the synchronization starts in the gear-engaging operation) of the clutch sleeve 252 when it is moved from the neutral state toward the fifth speed gear 241 side (toward the left in FIG. 6) and arrives at the front end of the chamfer of the teeth 255a of the synchronizer ring 255 for the fifth speed gear 241, P5a denotes the shift stroke position (position where the synchronization ends in the gear-engaging operation) of the clutch sleeve 252 when it arrives at the rear end of the chamfer of the teeth 255a of the synchronizer ring 255 for the fifth speed gear 241, P4 denotes the shift stroke position of the clutch sleeve 252 when it arrives at the rear end of the teeth 255a of the synchronizer ring 255, P3 denotes the shift stroke position of the clutch sleeve 252 when it arrives at the front end of the chamfer of the dog teeth 241a for the fifth speed gear 241, P2 denotes the shift stroke position (shift stroke position where meshing of the clutch sleeve 252 with the dog teeth 241a is discontinued in the gear-disengaging operation) of the clutch sleeve 252 when it arrives at the rear end of the chamfer of the dog teeth 241a, and P1 denotes the shift stroke position (final shift stroke position in the gear-engaging operation) of the clutch sleeve 252 when it arrives at the rear end of the dog teeth 241a.

Further, P7 denotes the shift stroke position (position where the synchronization starts in the gear-engaging operation) of the clutch sleeve 252 when it is moved from the neutral state toward the fourth speed gear 242 (toward the right in FIG. 6) and arrives at the front end of the chamfer of the teeth 256a of the synchronizer ring 256 for the fourth speed gear 242, P7a denotes the shift stroke position (position where the synchronization ends in the gear-engaging operation) of the clutch sleeve 252 when it arrives at the rear end of the chamfer of the teeth 256a of the synchronizer ring 256 for the fourth speed gear 242, P8 denotes the shift stroke position of the clutch sleeve 252 when it arrives at the rear end of the teeth 256a of the synchronizer ring 256, P9 denotes the shift stroke position of the clutch sleeve 252 when it arrives at the front end of the chamfer of the dog teeth 242a for the fourth speed gear 242, P10 denotes the shift stroke position (shift stroke position where the meshing of the clutch sleeve 252 with the dog teeth 242a is discontinued in the gear-disengaging operation) of the clutch sleeve 252 when it arrives at the rear end of the chamfer of the dog teeth 242a, and P11 denotes the shift stroke position (final shift stroke position in the gear-engaging operation) of the clutch sleeve 252 when it arrives at the rear end of the dog teeth 242a. The shift stroke positions are detected by the shift stroke sensor 85 (SIS). In the illustrated embodiment, the shift stroke sensor 85 (SIS) is so constituted as to produce a voltage signal of the smallest value when the shift stroke position is P1, to produce an output voltage that gradually increases as the shift stroke position goes toward the P11 side, and produces a voltage signal of the greatest value when the shift stroke position is P11.

In shifting the clutch sleeve 252 from the neutral state shown in FIG. 6 toward either the fourth speed gear 242 side or the fifth speed gear 241 side (in engaging the gears), the greatest operation force acts on the speed-change lever 3 in the synchronizing range of from the shift stroke positions P7 or P5, i.e., from the positions at which the synchronizing action starts up to the shift stroke position P8 or P4 at which the synchronizing action ends. In the gear-engaging operation, therefore, the electric motor 81 (M1) may be driven in at least the synchronizing range to assist the shifting operation. In the gear-engaging operation, further, a relatively large force, though it is smaller than that in the above-mentioned synchronizing range, acts on the speed-change lever 3 in the engaging range of from the shift stroke position P9 or P3 to the shift stroke position P10 or P2, i.e., in a range where the chamfer of the spline 252b of the clutch sleeve 252 engages with the chamfer of the dog teeth 242a or 241a. In the gear-engaging operation, therefore, it is desired to assist the shifting operation by driving the electric motor 81 (M1) even during the period in which the dog teeth engage with the chamfer of the clutch sleeve. When the clutch sleeve 252 returns to the neutral state from a state of being engaged with the fourth speed gear 242 or the fifth speed gear 241, i.e., from the shift stroke position P11 or P1, further, a relatively large force acts on the speed-change lever 3 during a period until the spline 252b of the clutch sleeve 252 passes through the shift stroke position P10 or P2, i.e., passes through the rear end of the chamfer of the dog teeth. At the time of this gear-disengaging operation, therefore, the shifting operation may be assisted by driving the electric motor 81 (M1) during the shift stroke of from the gear-engaged state until the rear end of the chamfer of the dog teeth is passed (i.e., in the range at which the dog teeth are in mesh with the clutch sleeve 252).

The assisting force in the gear-disengaging operation may be smaller than the assisting force in the gear-engaging operation. The assisting force is controlled by controlling the voltage or the current fed to the electric motor 81 (M1). The rotational direction in which the electric motor 81 (M1) is driven is, for example, the forward rotation when the clutch sleeve 252 is operated toward the left in FIG. 6 (when the first switch 41 (SW1) of the shift knob switch 4 is turned on) and is, for example, the reverse rotation when the clutch sleeve 252 is operated toward the right in FIG. 6 (when the second switch 42 (SW2) of the shift knob switch 4 is turned on). When, for example, the state where the gear is engaged with the fifth speed gear 241 is to be shifted down to the fourth speed, the electric motor 81 (M1) is reversely driven with a voltage V1a from P1 to P2, i.e., until the spline 252b of the clutch sleeve 252 passes over the rear end of the chamfer of the dog teeth 241a (during a period in which the dog teeth are in mesh with the clutch sleeve 252) as shown in FIG. 6. Then, the voltage is gradually lowered during a period of P2 to P5 to halt the operation of the electric motor 81 (M1). In the illustrated embodiment, the assisting force in the gear-disengaging operation, i.e., the voltage applied to the electric motor 81 (M1) is obtained by adding up an initial set-point voltage V1a set correspondingly to the shift stroke position in the gear-disengaging operation and a correction voltage calculated based on the shifting operation speed in the gear-disengaging operation. How to determine the voltage V1 applied to the electric motor 81 (M1) in the gear-disengaging operation will be described hereinafter in detail.

When the clutch sleeve 252 arrives at P7 at which the synchronizing action starts from the neutral position P6, the electric motor 81 (M1) is reversely driven with a voltage V2 higher than the above voltage V1. In the embodiment shown in FIG. 6, the reverse rotation is maintained with the voltage V2 for a period until the spline 252b of the clutch sleeve 252 passes P10 that corresponds to the rear end of the chamfer of the dog teeth 242a. The assisting force in the gear-engaging operation, i.e., the voltage V2 applied to the electric motor 81 (M1) is obtained by adding up an initial set-point voltage V2a set correspondingly to the shift stroke position in the gear-engaging operation and a correction voltage calculated based on the shifting operation speed in the gear-engaging operation. How to determine the voltage V2 applied to the electric motor 81 (M1) in the gear-engaging operation will be described hereinafter in detail.

As described above, when the clutch sleeve 252 passes over P10, the voltage applied to the electric motor 81 (M1)

is gradually lowered and the electric motor 81 (M1) is brought into a halt when the shift stroke position P11 is reached. In the shift-assisting device of the illustrated embodiment as described above, the assisting force is controlled correspondingly to the shift stroke position. Accordingly, no time lag occurs in driving the electric motor, and the force for operating the speed-change lever can be made uniform over the full stroke in the shifting operation.

Figure 7:
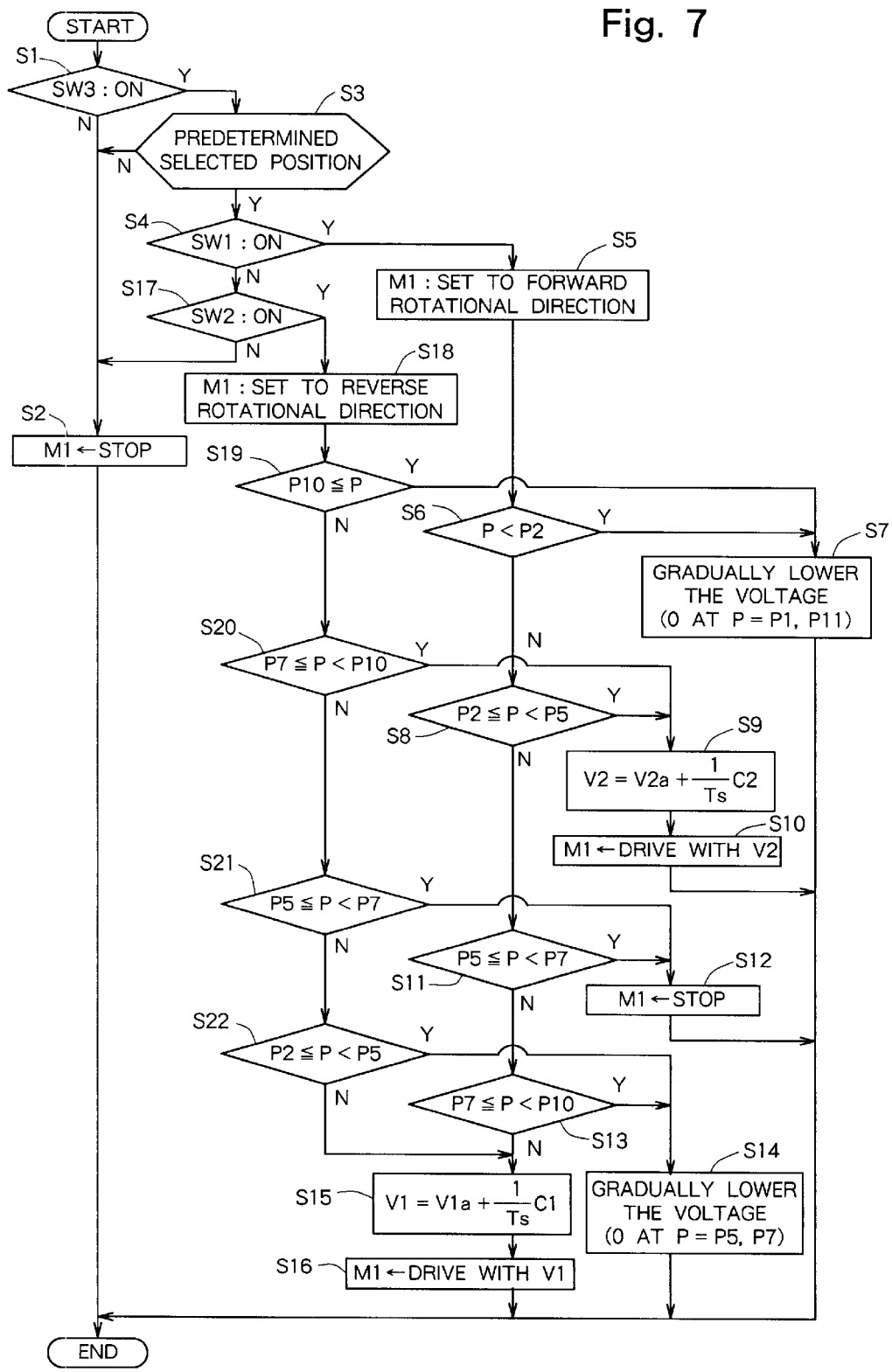
FIG. 7 is a flowchart illustrating a procedure of shift-assist control operation of a controller that constitutes the shift-assisting device for the transmission, constituted according to the present invention.
Figure 8:
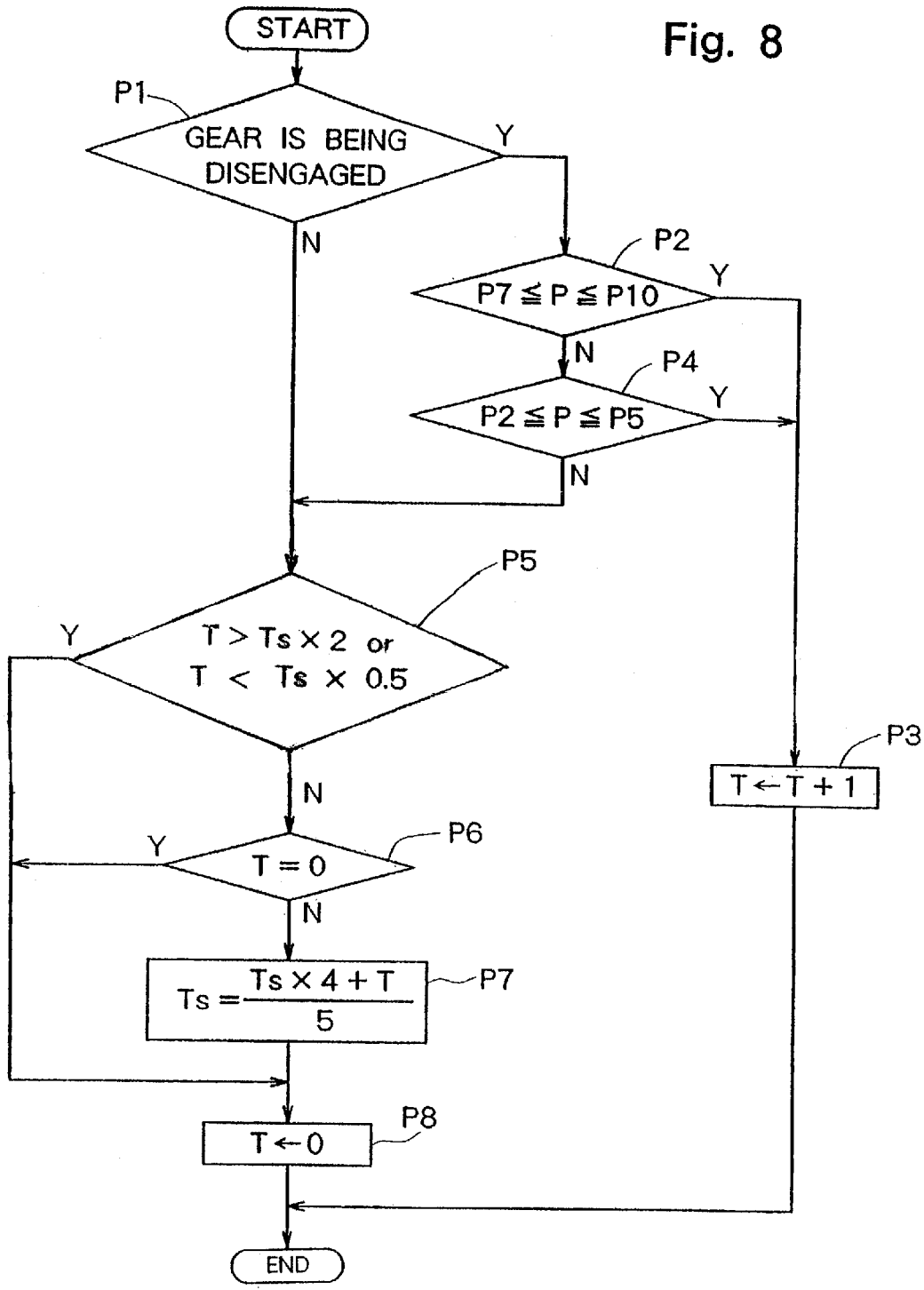
FIG. 8 is a flowchart illustrating a procedure of control operation for obtaining an average shifting operation speed by a controller that constitutes the shift-assisting device for the transmission, constituted according to the present invention.

Next, the operation of the controller 10 for assisting the shifting operation in the speed-change operation will be described with reference to flowcharts shown in FIGS. 7 and 8. FIG. 7 is a flowchart illustrating a main routine for controlling the shift assist, and FIG. 8 is a flowchart illustrating a subroutine for obtaining the shifting operation speed.

First, the controller 10 checks at step S1 in the main routine shown in FIG. 7 whether the clutch pedal switch 91 (SW3) is turned on, i.e., whether the clutch pedal 9 is depressed to disconnect the clutch. When an automatic clutch is mounted, it is checked whether the amount of engagement of the clutch is on the disconnected side rather than the partly-connected state of the clutch based on a signal from the clutch stroke sensor that detects the amount of engagement of the clutch. When the clutch pedal switch 91 (SW3) has not been turned on at step S1, the controller 10 judges that the driver is not willing to change the speed since the clutch has not been disconnected, and the routine proceeds to step S2 to end the operation by bringing the electric motor 81 (M1) to a halt.

When the clutch pedal switch 91 (SW3) has been turned on at step S1, the controller 10 judges that the clutch has been disconnected and the driver is willing to change the speed, and the routine proceeds to step S3 where it is checked whether the position of the shift lever 64 in the direction of selection detected by the selected position sensor 75 (SES) is at a predetermined selected position. That is, it is checked whether the shift lever 64 is at a position to engage with only one of the shift blocks 661, 662 and 663 mounted on the shift rods 651, 652 and 653. When the shift lever 64 has not been brought to a predetermined selected position at step S3, the controller 10 judges that the shift lever 64 may engage with two shift blocks when the electric motor 81 (M1) is driven in this state, and the routine proceeds to step S2 to end the operation by bringing the electric motor 81 (M1) to a halt. If the electric motor 81 (M1) is driven in a state where the shift lever 64 has not been brought to a predetermined selected position, the shift lever 64 engages with the two shift blocks to actuate the two shift rods simultaneously. Therefore, the interlocking mechanism works to limit the operation of the shift rods, and the electric motor 81 (M1) that is being driven may seize. In the illustrated embodiment, however, when the shift lever 64 has not been brought to a predetermined selected position as described above, the routine proceeds to step S2 to bring the electric motor 81 (M1) to a halt, whereby the electric motor 81 (M1) can be beforehand prevented from seizing.

When the position of the shift lever 64 in the direction of selection detected by the selected position sensor 75 (SES) has been brought to a predetermined selected position at step S3, the controller 10 proceeds to step S4 where it is checked whether the first switch 41 (SW1) of the shift knob switch 4 is turned on, i.e., whether the operation has started to change the speed toward the first gear position, third gear position or fifth gear position. When the first switch 41 (SW1) has been turned on at step S4, the controller 10 proceeds to step S5 to set the electric motor 81 (M1) to turn forward. The routine then proceeds to step S6 where it is checked whether the shift stroke position P detected by the shift stroke sensor 85 (SIS) is smaller than P2, i.e., whether the clutch sleeve 252 is closer to the gear-engaging side rather than the rear end of the chamfer of the dog teeth 241*a*. When the shift stroke position P is smaller than P2 at step S6, the controller 10 judges that the clutch sleeve 252 is on the gear-engaging side rather than the rear end of the chamber of the dog teeth 241*a* and there is no need of assisting the shift. The routine then proceeds to step S7 where the voltage applied to the electric motor 81 (M1) is gradually decreased and is brought to zero (0) after the shift stroke position P has reached P1.

When the shift stroke position P is larger than P2 at step S6, the controller 10 proceeds to step S8 to check whether the shift stroke position P is larger than P2 but is smaller than P5, i.e., whether the clutch sleeve 252 is in a range of from a position of starting the synchronization up to a position where it engages with the chamfer of the dog teeth. When the shift stroke position P is larger than P2 but is smaller than P5 at step S8, the controller 10 judges that the clutch sleeve 252 is in the range of from the position of starting the synchronization to the position where it engages with the chamfer of the dog teeth, and that the shifting must be assisted in the gear-engaging operation. The routine therefore proceeds to step S9 to determine the voltage V2 (V2=V2*a*+(1/Ts)C2) for driving the electric motor 81 (M1). In the above formula for obtaining the voltage V2, V2*a* is an initial set-point voltage, Ts is an average shifting operation time in which the shift stroke position moves from P2 to P5 and from P10 to P7 in the gear-disengaging operation (the average shifting operation time Ts is the average operation time for effecting the shifting in a predetermined section and hence, can be regarded to be the average shifting operation speed), and C2 is a constant. Thus, in the illustrated embodiment, the assisting force in the gear-engaging operation is determined, i.e., the voltage V2 applied to the electric motor 81 (M1) is determined based on the shifting operation time (shifting operation speed) Ts in which the shift stroke position moves from P2 to P5 and from P10 to P7 in the gear-disengaging operation. After having obtained the voltage V2 to be applied to the electric motor 81 (M1) in the gear-engaging operation as described above, the controller 10 proceeds to step S10 to drive the electric motor 81 (M1) with the voltage V2.

An embodiment for obtaining the average speed of shifting operation (average shifting operation speed) TS in the predetermined section will now be described with reference to the subroutine of FIG. 8. The subroutine of FIG. 8 is interrupt-controlled every after 5 msec, for example, while the main routine shown in FIG. 7 is executed.

First, the controller 10 checks whether the gear-disengaging operation is being executed at step P1. The controller 10 judges that the gear-disengaging operation is being executed when the first switch 41 (SW1) of the shift knob switch 4 that works as a shifting direction detection means is turned on and the shift stroke position lies in a shift stroke section of from P7 to P11, or when the second switch 42 (SW2) of the shift knob switch 4 is turned on and the shift stroke position lies in a shift stroke section of from P1 to P5.

When it is judged at step P1 that the gear-disengaging operation is being executed, the controller 10 proceeds to step P2 to check whether the shift stroke position P is larger than P7 but is smaller than P10. When the shift stroke position P is larger than P7 but is smaller than P10 at step P2, the controller 10 proceeds to step P3 to measure the shifting operation time (T) in which the shift stroke position P is shifted from P10 to P7. That is, the shifting operation time (T) is increased by plus 1 (+1) every after 5 msec so long as the shift stroke position P is larger than P7 but is smaller than P10. When the shift stroke position P is not larger than P7 or is not smaller than P10 at step P2, the controller 10 proceeds to step P4 to check whether the shift stroke position is larger than P2 but is smaller than P5. When the shift stroke position P is larger than P2 but is smaller than P5 at step P4, the controller 10 proceeds to step P3 to measure the shift operation time (T) in which the shift stroke position P is shifted from P2 to P5. As described above, the shift operation time (T) is increased by plus 1 (+1) every after 5 msec during the period in which the shift stroke position P is larger than P7 but is smaller than P10 and during the period in which the shift stroke position P is larger than P2 but is smaller than P5 in the gear-disengaging operation. In the illustrated embodiment, the shifting operation time (shifting operation speed) is detected in the section in which the shift stroke position P is larger than P7 but is smaller than P10 and in the section in which the shift stroke position P is larger than P2 but is smaller than P5 in the gear-disengaging operation because of the reason that the speed of the speed-change operation in the above sections is considered to most conspicuously reflect the driver's habit of operation. It is desired that the shift stroke section for detecting the shifting operation time (shifting operation speed) be a predetermined section of from the shift stroke positions P2 and P10 at which the clutch sleeve is disengaged from the dog teeth at the time of disengaging the gear to the neutral position P6.

When it is judged at step P1 that the gear is not being disengaged or when the shift stroke position P is not larger than P2 and is not smaller than P5 at step P4, the controller 10 proceeds to step P5 to check whether the measured shifting operation time (T) is larger than two times the past average shifting operation time (Ts)(i.e., T>Ts×2) or whether the measured shifting operation time (T) is smaller than 0.5 times the past average shifting operation time (Ts) (i.e., T<Ts×0.5). This check is made to exclude a value in a case where the measured shifting operation time (T) is greatly different from the average shifting operation time (Ts), since the average shifting operation time (Ts) collapses if the measured shifting operation time (T) is greatly different from the past average shifting operation time (Ts). Therefore, a value of how many times as great as the average shifting operation time (Ts) may be arbitrarily set to be a value to be excluded as the data.

When the shifting operation time (T) measured at step P5 is smaller than 2 times of the past average shifting operation time (Ts) and when the shifting operation time (T) measured at step P5 is larger than 0.5 times of the past average shifting operation time (Ts), i.e., when the measured shifting operation time (T) is normal, the controller 10 proceeds to step P6 to check whether the measured shifting operation time (T) is zero (0). When the above step P3 has been executed, the shifting operation time (T) is not zero (0). When the above step P3 has not been executed, the shifting operation speed is not detected in the section where the shift stroke position P is larger than P7 but is smaller than P10 and in the section where the shift stroke position P is larger than P2 but is smaller than P5 in the gear-disengaging operation. Hence, the shifting operation speed becomes zero (0). When the shifting operation time (T) is not zero (0) at step P6, the controller 10 proceeds to step P7 to update the average shifting operation time (Ts). The average shifting operation time (Ts) to be updated is obtained by, for example, Ts=(Ts×4+T)/5. The reason why the Ts value is obtained from the above equation, i.e., as an average of the sum of the average shifting operation time (Ts) multiplied by 4 and the shifting operation time (T) measured this time, is that a large variation scarcely occurs when importance is given to the past average shifting operation time (Ts) and that the habit of the driver can be reflected.

After the average shifting operation time (Ts) has been updated as described above, the controller 10 proceeds to step P8 to clear the shifting operation time (T). When the shifting operation time (T) measured at step P5 is larger than 2 times of the past average shifting operation time (Ts) or when the shifting operation time (T) measured at step P5 is smaller than 0.5 times of the past average shifting operation time (Ts), the controller 10 judges that the measured shifting operation time (T) is abnormal. Hence, the routine proceeds to step P8 to clear the shifting operation time (T). When the shifting operation time (T) is zero (0) at step P6, too, the controller 10 proceeds to step P8 to clear the shifting operation time (T). Thus, the average shifting operation time (Ts) is updated every time the speed-change operation is executed, and the updated average shifting operation time (Ts) is used for determining the voltage V2 applied to the electric motor 81 (M1) at step S9.

Reverting to the main routine of FIG. 7, when the shift stroke position P is larger than P2 but is not smaller than P5 at step S8, the controller 10 proceeds to step S11 to check whether the shift stroke position P is larger than P5 but is smaller than P7, i.e., whether the clutch sleeve 252 is positioned between the two synchronizer rings 255 and 256. When the shift stroke position P is larger than P5 but is smaller than P7 at step S11, the controller 10 judges that the clutch sleeve 252 is positioned between the two synchronizer rings 255 and 256 and there is no need to assist the shifting operation. The routine, therefore, proceeds to step S12 to bring the electric motor 81 (M1) to a halt.

When the shift stroke position P is larger than P5 but is not smaller than P7 at step S11, the controller 10 proceeds to step S13 to check whether the shift stroke position P is larger than P7 but is smaller than P10, i.e., whether the clutch sleeve 252 is disengaged from the dog teeth 242a to completely disengage the gear. When the shift stroke position P is larger than P7 but is smaller than P10 at step S13, the controller 10 judges that the clutch sleeve 252 is disengaged from the dog teeth 242a and the gear is disengaged. The routine, then, proceeds to step S14 where the voltage applied to the electric motor 81 (M1) is gradually lowered and is brought to zero (0) when the shift stroke position P has reached P11.

When the shift stroke position P is larger than P7 is not smaller than P10 at step S13, the controller 10 judges that the clutch sleeve 252 is in mesh with the dog teeth 42a and it is necessary to assist the shifting operation for disengaging the gear. The routine, therefore, proceeds to step S15 to determine the voltage V1 (V1=V1a+(1/Ts) C1) for driving the electric motor 81 (M1). In the above formula for obtaining the voltage V1, V1a is an initial set-point voltage, Ts is the average shifting operation time (the average shifting operation time Ts is the average operation time for shifting in a predetermined section, and can be regarded to be the average shifting operation speed) in which the shift stroke position P moves from P2 to P5 and from P10 to P7 in the gear-disengaging operation as obtained from the flowchart shown in FIG. 8, and C1 is a constant. Thus, in the illustrated embodiment, the assisting force in the gear-disengaging operation, i.e., the voltage V1 applied to the electric motor 81 (M1), is determined based on the shifting operation time (shifting operation speed) Ts in which the shift stroke position moves from P2 to P5 and from P10 to P7 in the gear-disengaging operation. After having obtained the voltage Vi to be applied to the electric motor 81 (M1) in the gear-engaging operation, the controller 10 proceeds to step S16 to drive the electric motor 81 (M1) with the voltage V1.

Next, described below is a case where the first switch 41 (SW1) of the shift knob switch 4 has not been turned on at step S4.

When the first switch 41 (SW1) of the shift knob switch 4 has not been turned on at step S4, the controller proceeds to step S17 to check whether the second switch 42 (SW2) is turned on, i.e., whether the operation has started to change the speed toward the second gear position, fourth gear position or reverse gear position. When the second switch 42 (SW2) has not been turned on at step S17, the controller 10 judges that the driver is not willing to change the speed, and the routine proceeds to step S2 to end the operation by bringing the electric motor 81 (M1) to a halt.

When the second switch 42 (SW2) has been turned on at step S17, the controller 10 proceeds to step S18 to set the electric motor 81 (M1) to rotate in the reverse direction and further proceeds to step S19 to check whether the shift stroke position P detected by the shift stroke sensor 85 (SS) is larger than P10, i.e., whether the clutch sleeve 252 is on the gear-engaging side rather than the rear end of the chamfer of the dog teeth 242a. When the shift stroke position P is larger than P10 at step S19, the controller 10 judges that the clutch sleeve 252 is on the gear-engaging side rather than the rear end of the chamfer of the dog teeth 242a and that there is no need to assist the shifting. The routine then proceeds to step S7 where the voltage applied to the electric motor 81 (M1) is gradually decreased and is brought to zero (0) after the shift stroke position P has reached P11.

When the shift stroke position P is smaller than P10 at step S19, the controller 10 proceeds to step S20 to check whether the shift stroke position P is larger than P7 but is smaller than P10, i.e., whether the clutch sleeve 252 is in the range of from a position for starting the synchronization to a position where it engages with the chamfer of the dog teeth. When the shift stroke position P is larger than P7 but is smaller than P10 at step S20, the controller 10 judges that the clutch sleeve 252 is in the range of from the position for starting the synchronization to the position where it engages with the chamfer of the dog teeth and that the shifting must be assisted in the gear-engaging operation. Therefore, the routine proceeds to step S9 to determine the voltage V2 to be applied to the electric motor 81 (M1) in the gear-engaging operation. The routine, then, proceeds to step S10 to drive the electric motor 81 (M1) with the drive voltage V2 obtained at step S9.

When the shift stroke position P is not larger than P7 and is smaller than P10 at step S20, the controller 10 proceeds to step S21 to check whether the shift stroke position P is larger than P5 but is smaller than P7, i.e., whether the clutch sleeve 252 is positioned between the two synchronizer rings 255 and 256. When the shift stroke position P is larger than P5 but is smaller than P7 at step S21, the controller 10 judges that the clutch sleeve 252 is positioned between the two synchronizer rings 255 and 256 and that there is no need to assist the shifting operation. The routine, then, proceeds to step S12 where the electric motor 81 (M1) is brought to a halt.

When the shift stroke position P is not larger than P5 and is smaller than P7 at step S21, the controller 10 proceeds to step S22 to check whether the shift stroke position P is larger than P2 but is smaller than P5, i.e., to check whether the clutch sleeve 252 is disengaged from the dog teeth 241a and the gear-disengaging operation is finished. When the shift stroke position P is larger than P2 but is smaller than P5 at step S22, the controller 10 judges that the clutch sleeve 252 is disengaged from the dog teeth 241a and that the gear-disengaging operation is finished. The routine, then, proceeds to step S14 where the voltage applied to the electric motor 81 (M1) is gradually decreased and is brought to zero (0) after the shift stroke position P has reached P5.

When the shift stroke position P is not larger than P2 and is smaller than P5 at step S22, the controller 10 judges that the clutch sleeve 252 is in mesh with the dog teeth 241a and that the shifting must be assisted in the gear-disengaging operation. Therefore, the routine proceeds to step S15 to determine the voltage V1 to be applied to the electric motor 81 (M1) in the gear-disengaging operation. The routine, then, proceeds to step S16 to drive the electric motor 81 (M1) with the voltage V1 obtained at step S15.

The above-mentioned embodiment has dealt with the example of obtaining an average shifting operation speed based on the operation speed in the sections of from the shift stroke positions P10, P2 at which the clutch sleeve of the synchronizing mechanism disengages from the dog teeth up to the shift stroke positions P7, P5 at which the clutch sleeve reaches the front end of the chamfer of the teeth of the synchronizer rings in the gear-disengaging operation. Peculiar habit of the driver, however, can also be reflected even by obtaining the average shifting operation speed based on the operation speed in the gear-engaging operation. In the gear-engaging operation, it is desired that the average shifting operation speed be obtained based on the operation speed in predetermined sections of from the positions P7a, P5a at which the synchronizing operation of the synchronizing mechanism ends up to the final shift stroke positions P11, P1 in the gear-engaging operation.

Being constituted as described above, the shift-assisting device for a transmission of the invention exhibits actions and effects as described below.

That is, according to the present invention, it is so constructed that the electric power for driving the shift-assisting electric motor is determined based on an average shifting operation speed in a predetermined shift stroke section, and the electric motor is driven with the thus determined electric power. Consequently, it is possible to obtain a shift-assisting force reflecting the habit of the driver.

We claim:

1. A shift-assisting device for a transmission having a plurality of gears and equipped with a shifting mechanism and an electric motor for operating the shifting mechanism in the same direction as the direction in which a speed-change lever is shifted, the shifting mechanism being coupled to the speed-change lever and actuating a synchronizing mechanism of the transmission, said shift-assisting device comprising:

a shift stroke sensor for detecting a shift stroke position of the shifting mechanism;

a shifting direction detection means that produces signals corresponding to the operation of the speed-change lever in a first shifting direction and in a second shifting direction; and a controller for providing a drive signal to the electric motor based on the detected shift stroke position and on the signals produced by said shifting direction detection means;

wherein said controller judges whether the gears are to be disengaged or engaged based on the signals produced by said shifting direction detection means corresponding to the shifting direction of the speed-change lever and on the detected shift stroke position of the shifting mechanism, detects a shifting operation speed, obtains an average shifting operation speed in the gear-disengaging operation or in the gear-engaging operation, determines the electric power for driving the electric motor based on the obtained average shifting operation speed, and drives the electric motor with the determined electric power.

2. A shift-assisting device for a transmission according to claim 1, wherein the shifting operation speed in the gear-disengaging operation is an operation speed in a predetermined section from a shift stroke position where the clutch sleeve of the synchronizing mechanism is disengaged from dog teeth of the synchronizing section to a neutral position.

3. A shift-assisting device for a transmission according to claim 1, wherein the shifting operation speed in the gear-engaging operation is an operation speed in a predetermined section from a position where the synchronization of the synchronizing mechanism ends to a final shift stroke position in the gear-engaging operation.

4. A shift-assisting device for a transmission according to claim 1, wherein the electric power for driving the electric motor is determined by adding up an initial set-point amount of electric power that is set based on the shift stroke position, and a corrected electric power amount that is calculated based on the average shifting operation speed in the gear-disengaging operation.

* * * * *